US010804842B2

(12) United States Patent
Anaya et al.

(10) Patent No.: US 10,804,842 B2
(45) Date of Patent: Oct. 13, 2020

(54) TEMPERATURE CONTROLLED PLATFORM, SYSTEM, AND METHOD FOR HOLDING, PROBING, AND TESTING SOLAR CELLS

(71) Applicant: The Boeing Company, Chicago, IL (US)

(72) Inventors: Ricardo Anaya, Pasadena, CA (US); Dale H. Waterman, Sylmar, CA (US)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 16/157,448

(22) Filed: Oct. 11, 2018

(65) Prior Publication Data
US 2019/0103833 A1    Apr. 4, 2019

Related U.S. Application Data

(63) Continuation of application No. 15/211,404, filed on Jul. 15, 2016, now Pat. No. 10,128,792.

(60) Provisional application No. 62/260,191, filed on Nov. 25, 2015.

(51) Int. Cl.
H02S 50/10    (2014.01)
(52) U.S. Cl.
CPC .................. *H02S 50/10* (2014.12)
(58) Field of Classification Search
CPC ................. H02S 50/10; H02S 50/15
USPC ............................ 324/501, 750.08
See application file for complete search history.

(56) References Cited

U.S. PATENT DOCUMENTS

2010/0236035 A1\* 9/2010 Chung .................... H01L 31/18
  29/25.01
2011/0279141 A1   11/2011 Wang et al.

FOREIGN PATENT DOCUMENTS

| CN | 103490724 A | 1/2014 |
| JP | 2014049655 A | 3/2014 |
| TW | 201021144 A | 6/2010 |
| TW | 201217805 A | 5/2012 |

OTHER PUBLICATIONS

CN Office Action; Application. No., 201611048496.5, dated Jul. 17, 2019.
TW Search Report, pp. 1-5, dated Dec. 26, 2019.

\* cited by examiner

*Primary Examiner* — Farhana A Hoque
(74) *Attorney, Agent, or Firm* — Vivacqua Law

(57) ABSTRACT

A platform for testing a solar cell is disclosed. The platform includes a plate defining a conductive surface configured to electrically contact the solar cell, two or more first vacuum ports disposed along a first area of the conductive surface of the plate, and two or more second vacuum ports disposed along a second area of the conductive surface of the plate. The second area covers a larger portion of the conductive surface compared to the first area. The solar cell is sized to seat against the first area of the conductive surface. The platform also includes a valve-sensor unit in fluid communication with the first vacuum ports and the second vacuum ports and a control board connected to the valve-sensor unit. The control board executes instructions to monitor a first pressure in the first vacuum ports and a second pressure in the second vacuum ports by the valve-sensor unit.

20 Claims, 13 Drawing Sheets

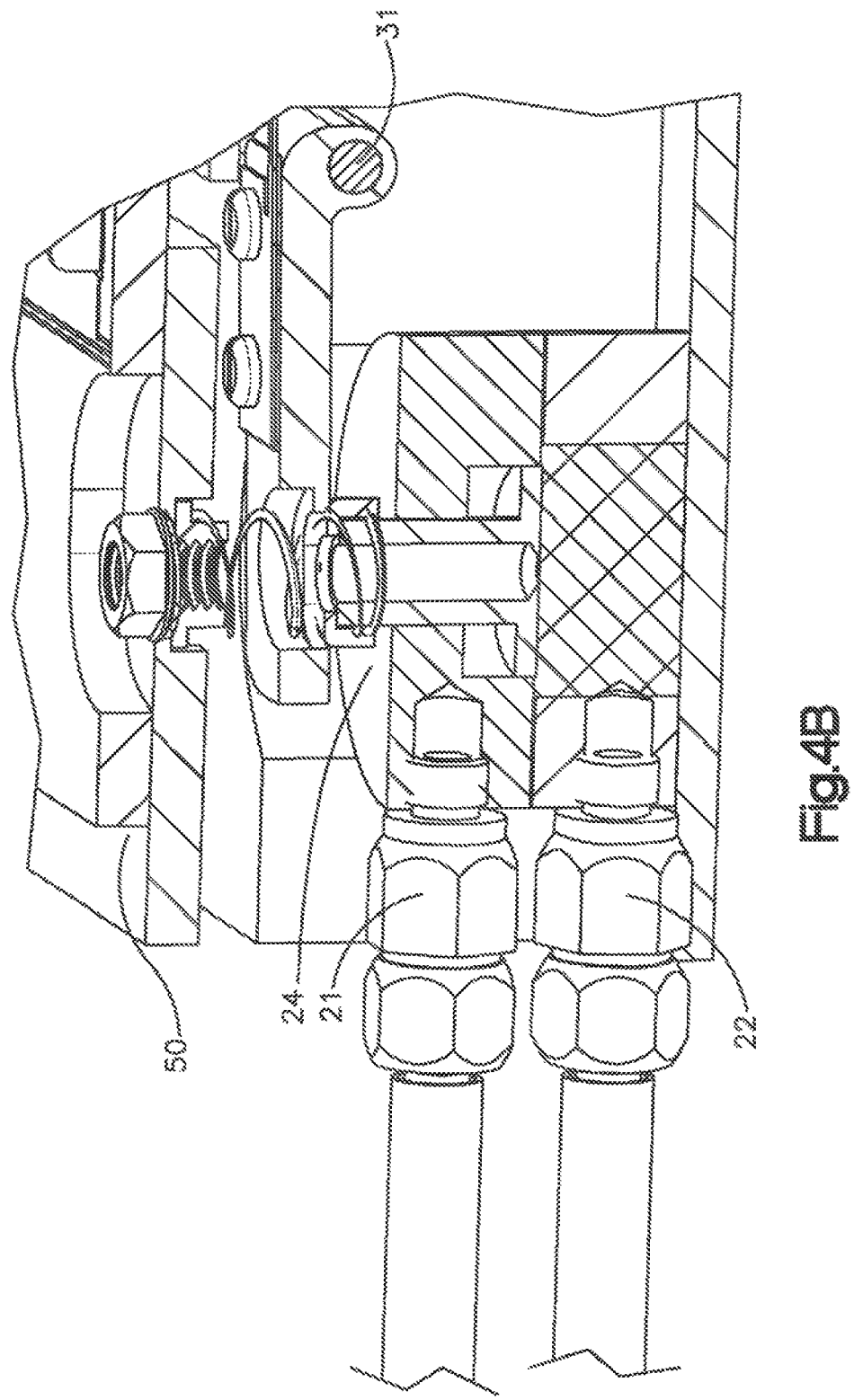

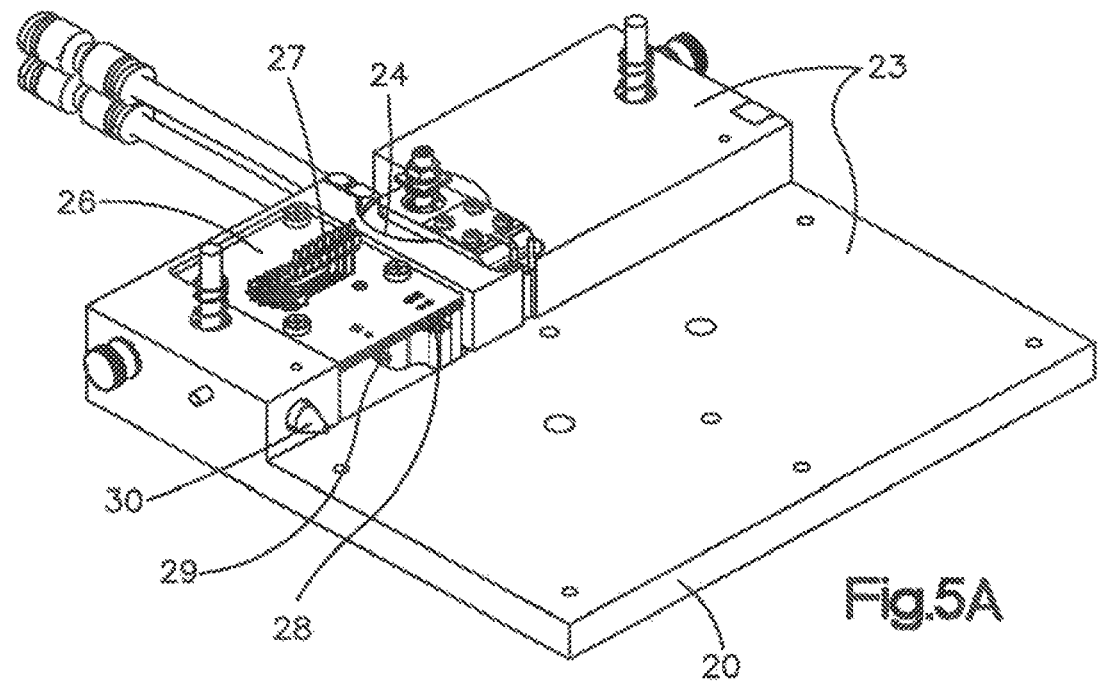
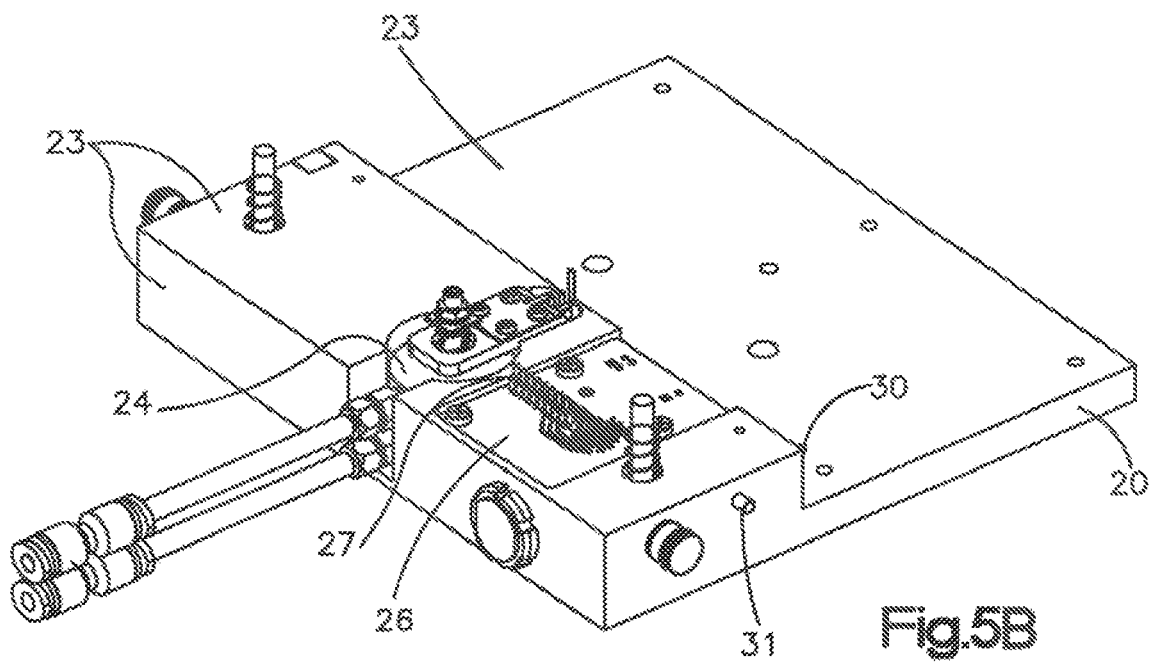

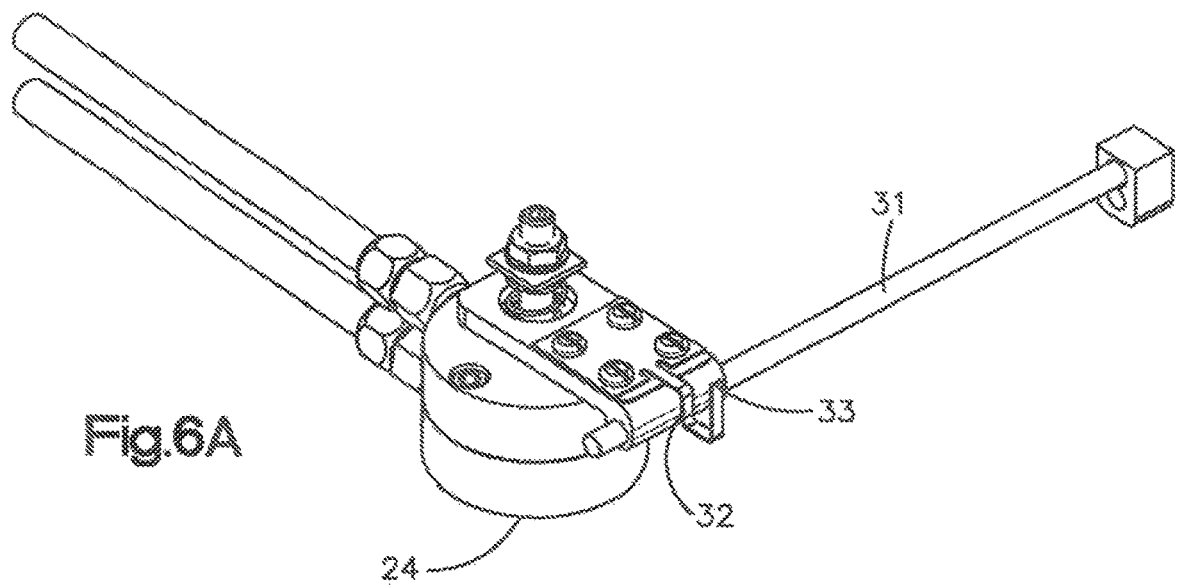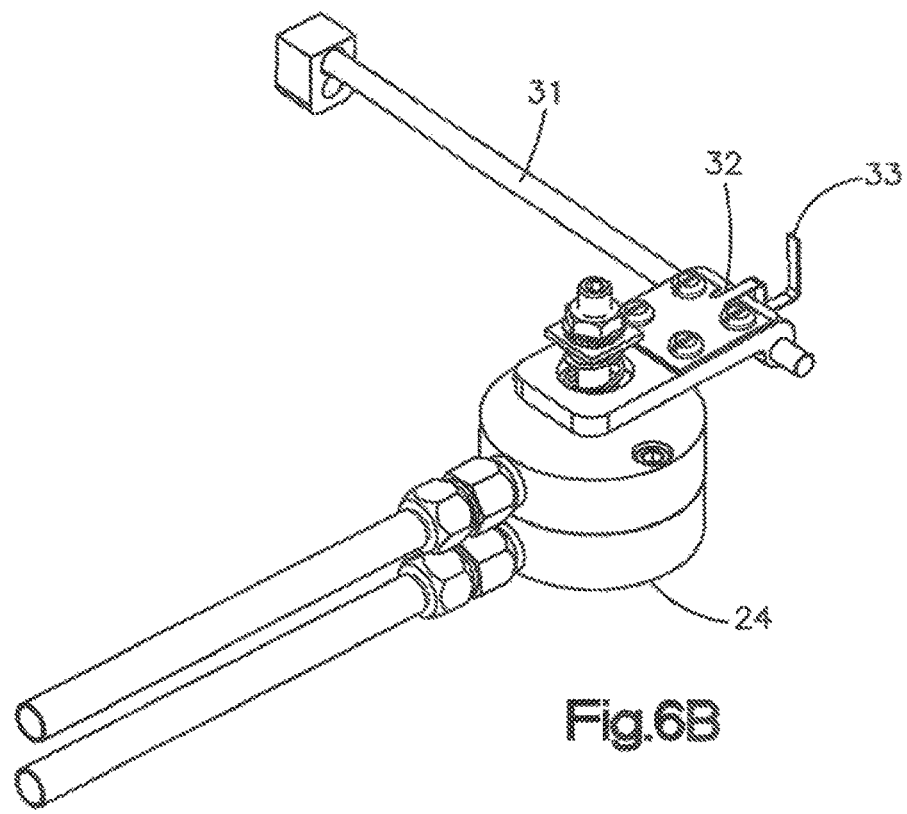

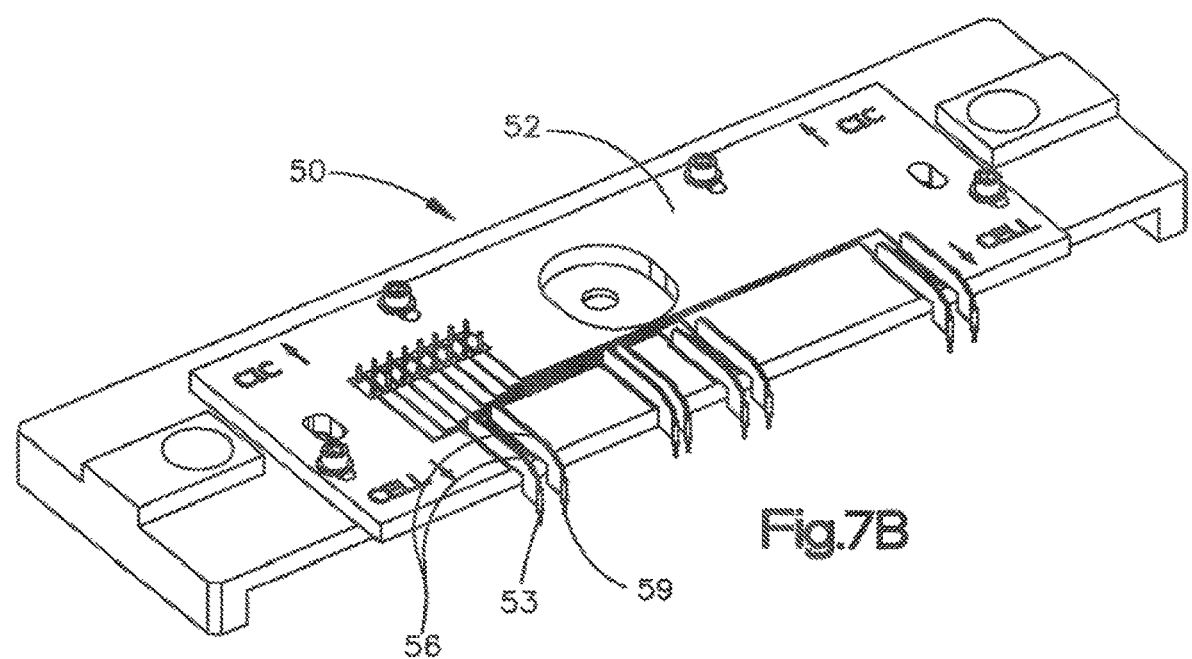
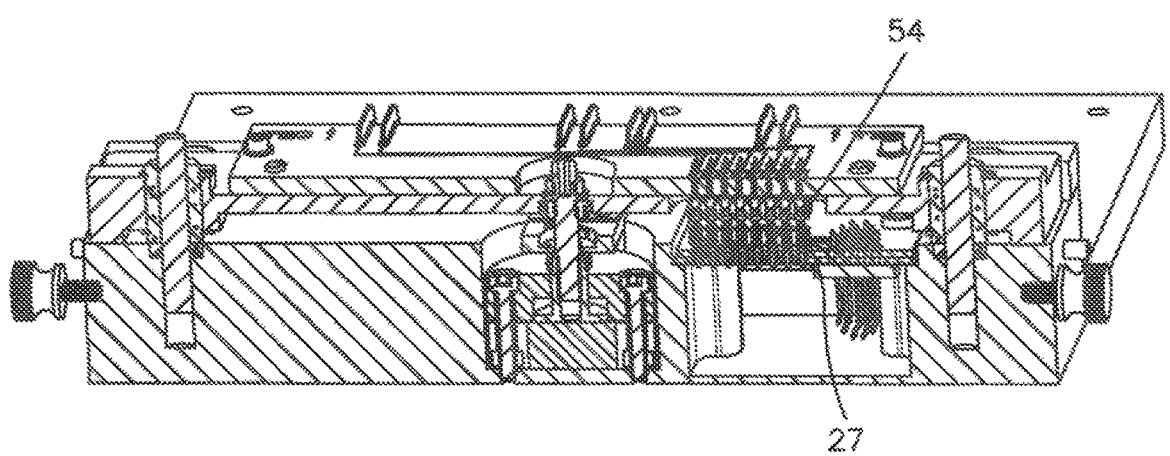

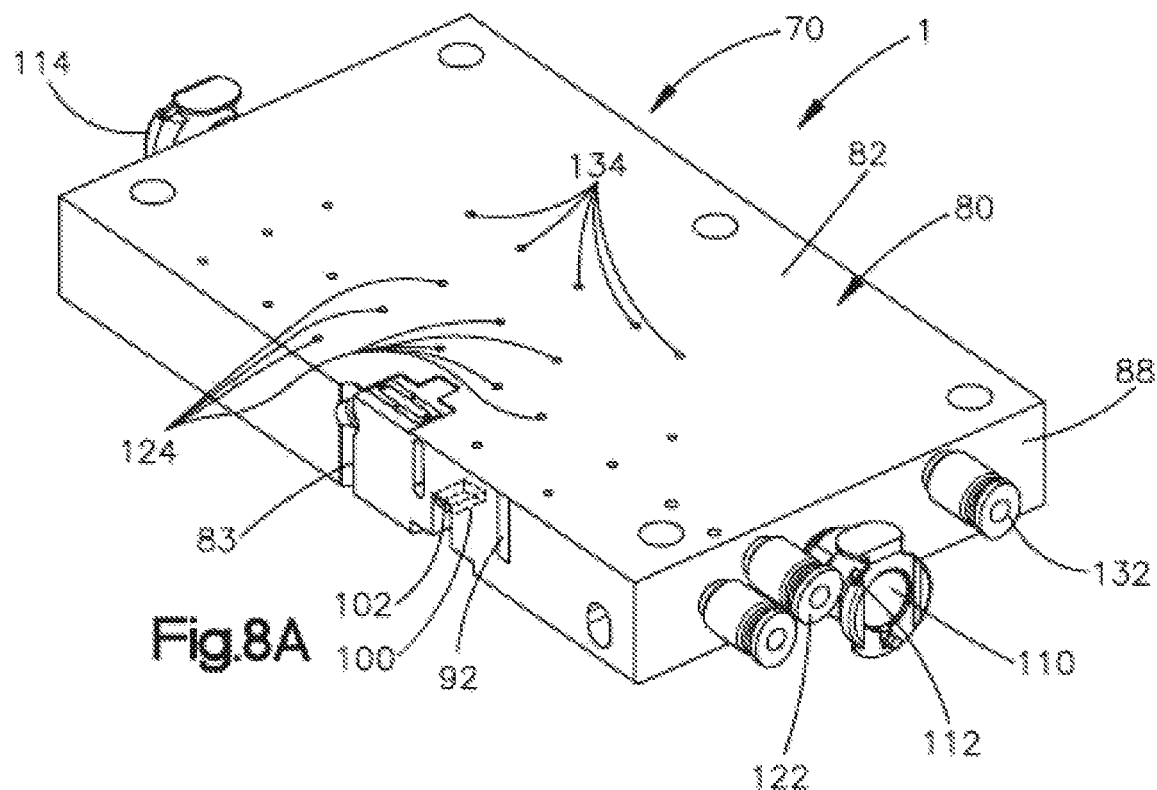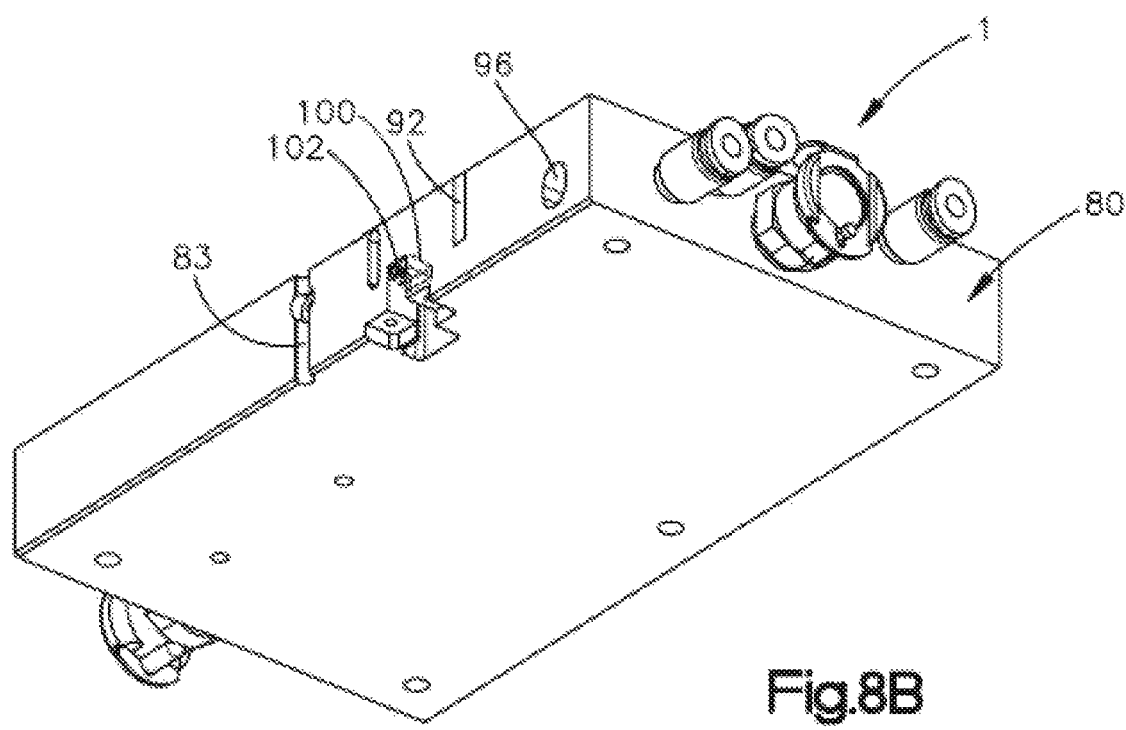

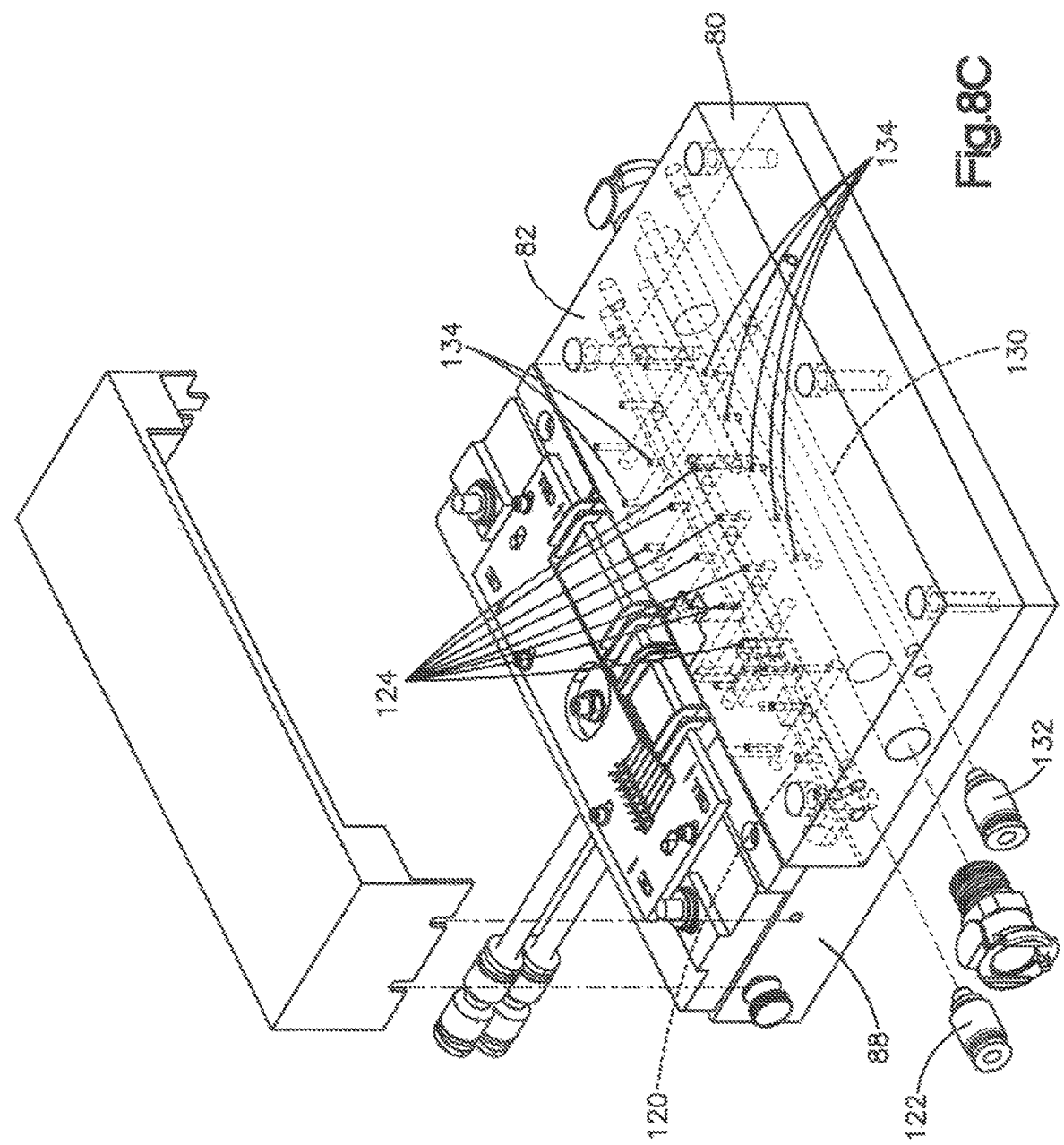

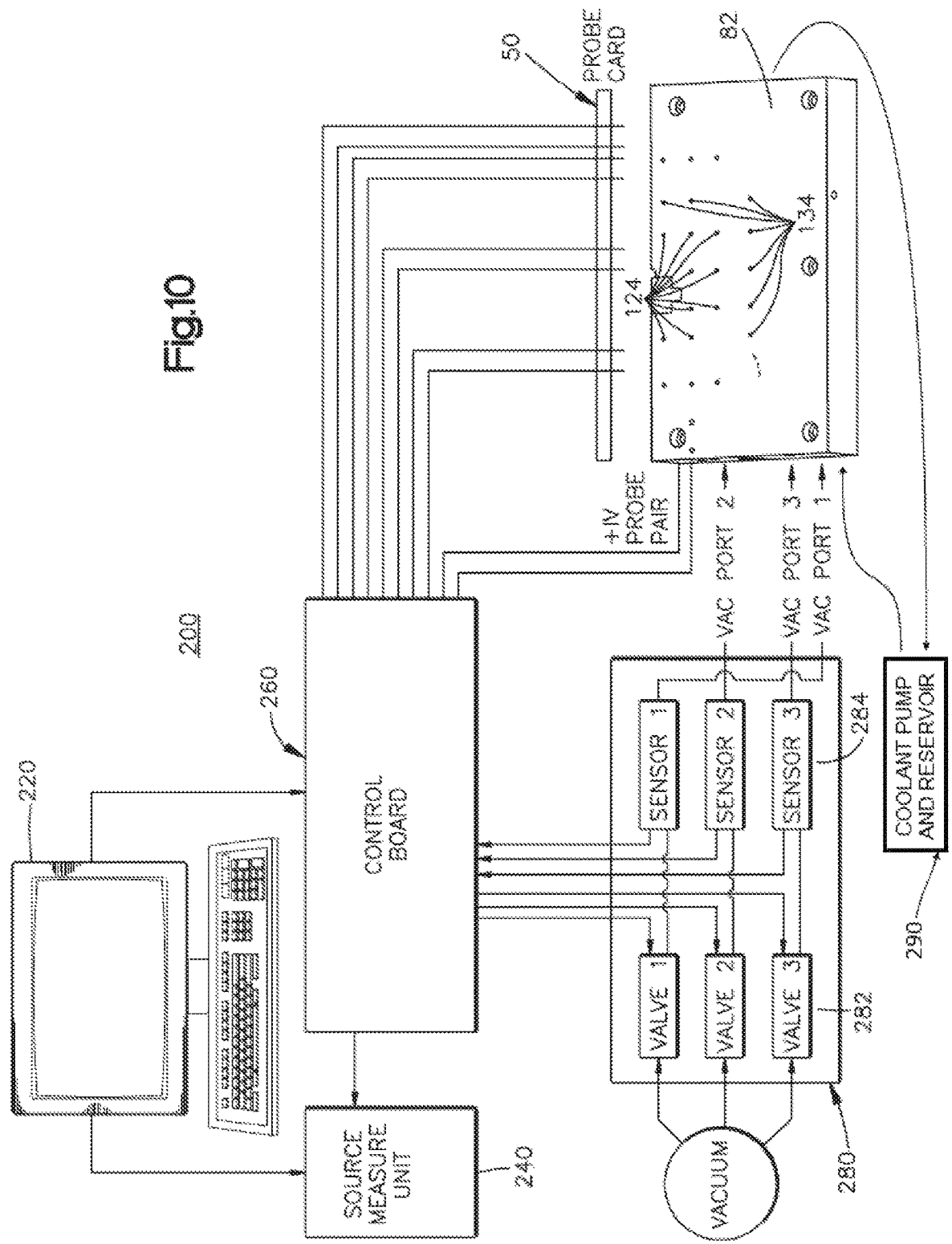

TEMPERATURE CONTROLLED PLATFORM, SYSTEM, AND METHOD FOR HOLDING, PROBING, AND TESTING SOLAR CELLS

RELATED APPLICATIONS

This application is a continuation of U.S. application Ser. No. 15/211,404 filed on Jun. 16, 2016, which claims the benefit of U.S. Provisional Patent Application No. 62/260,191 filed on Nov. 25, 2015, where the entirety of both is hereby incorporated by reference.

TECHNICAL FIELD

The present application is directed to the testing of solar cells and, more particularly, to a system and method for flexible testing of photovoltaic solar cells.

BACKGROUND

Solar cells, for example photovoltaic cells (PVCs), have been used for many years to generate electrical energy from sunlight. Hereafter, the terms "solar cells" and "PVCs" will be used interchangeably and refer to cells that generate electrical power from exposure to light. Solar panels, which typically include many individual cells, have been deployed in space and terrestrial applications.

Terrestrial photovoltaic cells may be exposed to "multiple" sun sources using mirrors, reflectors, and/or lenses that concentrate sunlight into a smaller area, which results in higher radiation energy per square unit of area. Such concentration is desirable to generate higher current per cell. This concentrated level of energy generates high levels of heat that places stresses on the internal structures of the PVC as well as electrical connections and mechanical attachment points. Temperature gradients often develop between adjacent portions of the PVC.

Over time, these elevated temperatures and temperature gradients degrade the performance of PVCs and can trigger failures in the PVC, electrical connections or mechanical attachment points. Understanding the conditions under which PVCs fail enables engineers to develop solutions to mediate design problems within the PVCs and associated structures. Stress testing can assist engineering in developing failure rate metrics useful for system integrators that use PVCs in commercial applications.

Accordingly, test equipment and technologies for terrestrial photovoltaic cells are designed to test PVCs not only by approximating the incident light and environmental conditions likely to be seen by the PVCs, but also by thermally stressing the PVCs to determine the long term effects of thermal stresses on the PVCs. These methods can involve creating higher thermal stresses and sharper temperature gradients than typically would be seen in commercial applications. Creating these thermal stresses allow characterization of the PVCs in comparatively shorter periods of time.

Recreating the thermal stresses on the PVC can be accomplished in various ways. Current tests include exposing the PVCs to concentrated sunlight for extended periods of time, placing PVCs in thermal cycling chambers to simulate different thermal conditions, and applying electrical currents to stress the PVCs and electrical connections.

Many thermal tests take comparatively long periods of time to perform. Thermal test methods include placing the PVC to be tested in a controlled temperature environment, such as a thermal cycle chamber where inside the chamber the ambient temperature can be controlled. The ambient temperature is then cycled to different temperatures for varying periods of time, and then the performance of the PVC is measured to determine how the PVC was affected. Generally, it takes some time for all the components to equalize with the internal ambient temperature using a thermal cycle chamber, and therefore cycle times for some tests can be fairly long, lasting from minutes to hours for each cycle.

Moreover, thermal cycle chambers typically are not representative of operating conditions in the field. Thermal cycle chambers convectively heat or cool the PVCs test samples evenly over a relatively long period of time. In contrast, the field temperature stresses typically occur much faster. Also the distribution of heat in the field will generally tend to be non-uniform across the entire PVC assembly. For example, in a thermal cycle chamber, the temperature typically is consistent from the front to the rear of the solar cell and at the mechanical and electrical interconnections. In the field, however, sunlight heats the front of the PVC whereas the rear of the PVC is typically attached to a heat sink structure, creating a temperature gradient from the front of the PVC to the rear of the PVC. Also, in the field, the mechanical and electrical connections often receive relatively little or no heating from sunlight, but considerable heating from convection, heat conduction, or electrical current passing through them.

Another thermal test method is the dark forward thermal cycle. Often performed in a thermal cycle chamber, the dark forward thermal cycle involves forward biasing the PVC to generate current through the PVC. The generated current simulates approximately the amount of current that would be produced by illuminating the PVC with sunlight. Using the dark forward thermal cycle method, it is also possible to force more current through the PVC than would be possible using illumination alone.

Each of these test methods requires the application of a unique set of parameters, to a multitude of variously sized PVCs, all with a consistent application of the testing parameters to ensure reliability and accuracy. More specifically, many of the previously practiced test methods resulted in damage to a large number of tested PVCs as a result of using threaded vacuum ports (having metal burrs stick into the PVC) and using blade probes (causing scrub and damage to the PVC when probing). Heretofore, transitioning between tests of different sized PVCs required varying degrees of system reconfiguration that was time consuming, inefficient, and damaged the PVCs.

Advantages over the prior art are herewith provided in the following disclosure.

SUMMARY

In one example, a platform for testing a solar cell is disclosed. The platform includes a plate defining a conductive surface configured to electrically contact the solar cell. The plate defines two or more first vacuum ports disposed along a first area of the conductive surface of the plate and two or more second vacuum ports disposed along a second area of the conductive surface of the plate. The second area covers a larger portion of the conductive surface compared to the first area. The solar cell is sized to seat against the first area of the conductive surface. The platform also includes valve-sensor unit in fluid communication with the first vacuum ports and the second vacuum ports and a control board connected to the valve-sensor unit. The control board executes instructions to monitor a first pressure in the first vacuum ports and a second pressure in the second vacuum ports by the valve-sensor unit. The control board also executes instructions to determine the solar cell is seated against only the first area of the conductive surface of the plate based on the first pressure and the second pressure. In response to determining the solar cell is seated against only the first area of the conductive surface, the control board applies vacuum to only the first vacuum ports by the valve-sensor unit.

In another example, a method for testing a first solar cell is disclosed. The method includes placing the first solar cell upon a plate. The plate defines a conductive surface that electrically contacts the first solar cell. The method also includes covering, by the first solar cell, one or more first vacuum ports disposed along a first area of the conductive surface of the plate. The method further includes monitoring, by a valve-sensor unit, a first pressure in the first vacuum ports. The method also includes monitoring, by the valve-sensor unit, a second pressure in one or more second vacuum ports. The second vacuum ports are disposed along a second area of the conductive surface of the plate, and the second area covers a larger portion of the conductive surface when compared to the first area. The method also includes determining, by a control board, the solar cell is seated against only the first area of the conductive surface of the plate based on the first pressure and the second pressure. The control board is connected to the valve-sensor unit. Finally, in response to determining the solar cell is seated against only the first area of the conductive surface, the method applies vacuum to only the first vacuum ports by the valve-sensor unit.

Other aspects and advantages of the disclosed temperature controlled platform for holding, probing, and testing solar cells will be apparent from the following description, the accompanying drawings, and the appended claims.

BRIEF DESCRIPTION OF THE DRAWINGS

The concurrently filed figures represent various perspectives (e.g., from above, below, side views, individual component views, combined system views) of one example of the present disclosure. A person of ordinary skill in the art would understand that the specific components depicted in these figures are only representative and are not limiting. As such, the present disclosure does not lie in any single component, but rather in the collection of components described in their specific arrangement described. And a person of ordinary skill would understand the present disclosure to teach the disclosure described as well as those examples that replace certain disclosed components for components that serve similar purposes and will not disturb the novel features of the present disclosure.

FIG. 4B is a cross-sectional view of a pneumatic vertical actuator subassembly of the platform of FIG. 4A.

FIGS. 5A and 5B are top perspective views of a subassembly of the platform of FIG. 1, with the probe card and the modular probe plate portion removed.

FIGS. 6A and 6B are top perspective views of a pneumatic vertical actuator subassembly of the platform of FIG. 1.

FIG. 7B is a top perspective view of the probe card subassembly of FIG. 7A.

FIG. 7C is a cross-sectional view of a pneumatic vertical actuator subassembly and probe card subassembly of the platform of FIG. 1.

FIG. 8A is a top perspective view of a modular probe plate subassembly of the disclosed temperature controlled platform for holding, probing, and testing solar cells.

FIG. 8B is a bottom perspective view of the modular probe plate subassembly of FIG. 8A.

FIG. 8C is an exploded, top perspective view of the platform of the example of the disclosed temperature controlled platform for holding, probing, and testing solar cells of FIG. 8A.

FIG. 10 is an electrical schematic of a system incorporating the examples of the temperature controlled platform for holding, probing, and testing solar cells of FIGS. 1-9A.

DETAILED DESCRIPTION

The disclosed photovoltaic cells (hereinafter "PVC") testing system and method utilizes platforms configured to secure PVCs of varying sizes for safe, reliable, and efficient testing. When a PVC is introduced to the system for testing, the system automatically provides vacuum only to ports covered by the PVC, and the system may flexibly apply electrical contacts to the PVC's electrical contacts. This type of PVC testing provides for a more efficient transitioning between tests of different sized PVCs, without the need to change or modify the equipment between different PVC test as required by prior art systems. While the following discussion describes various examples of the disclosed system and method as automatically adaptable to PVCs of many shapes and sizes, it is to be understood that the platform of the present disclosure may comprise interchangeable probe plates and/or interchangeable probe cards, such that the disclosed system and method is compatible with a variety of PVCs with minimal degrees of manual reconfiguration.

Figure 1:
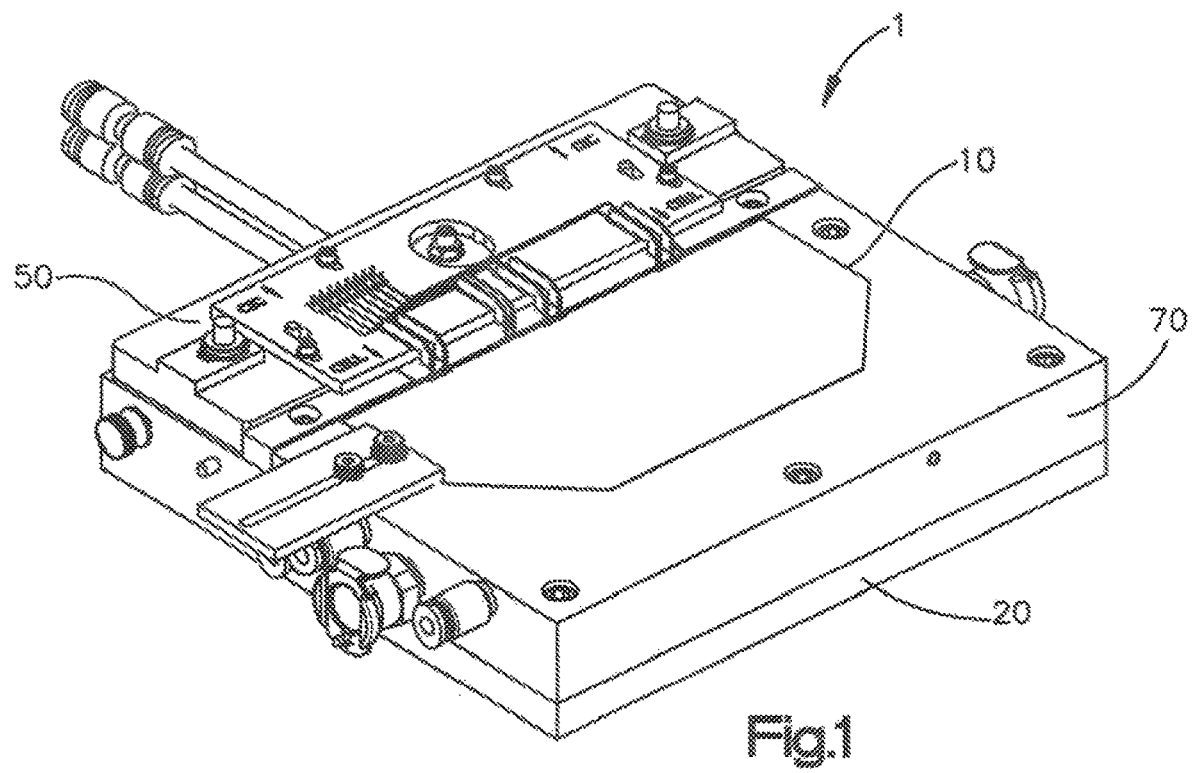
FIG. 1 is a top perspective view of one example of the disclosed temperature controlled platform for holding, probing, and testing solar cells.
Figure 2:
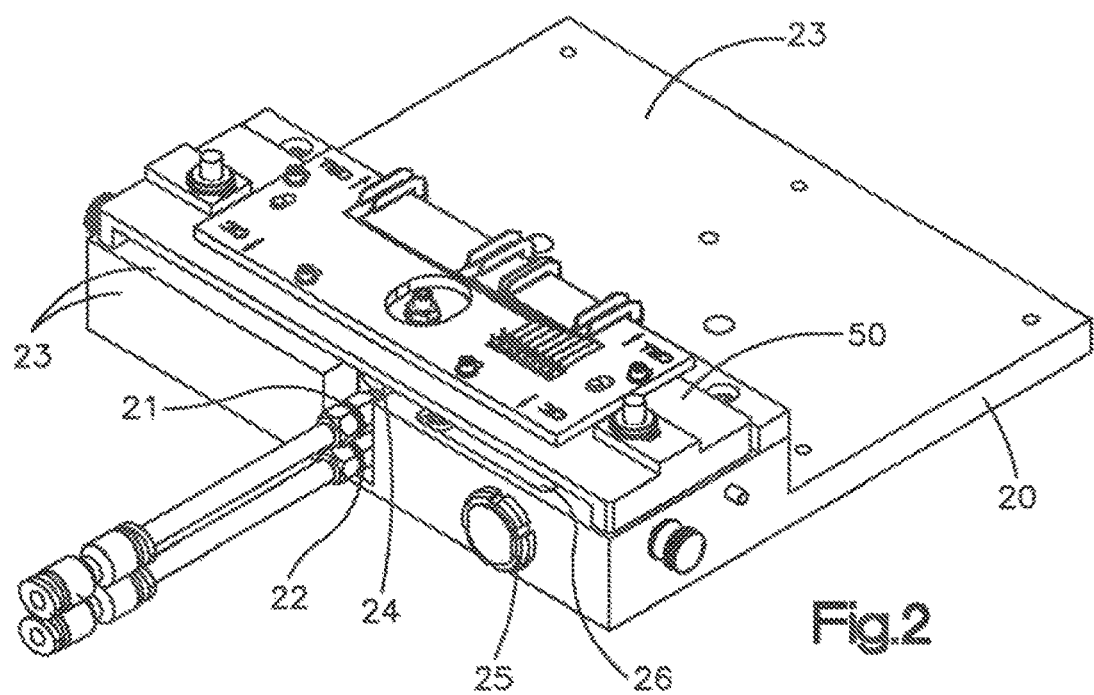
FIG. 2 is a top perspective view of a subassembly of the platform of FIG. 1, with the modular probe plate portion removed.

As shown in FIG. 1, an example of the disclosed temperature controlled platform, generally designated 1, for holding, probing, and testing solar cells is shown receiving a solar cell 10. The platform 1 includes a base 20, a probe card 50, and a probe plate 70. The base 20, as shown in FIG. 2, includes a first pressure port 21, a second pressure port 22, and a base connector port 25, all three disposed on the exterior of the base 20. A pneumatic vertical actuator 24 in FIG. 2 is in fluid communication with both the first pressure port 21 and the second pressure port 22, whereby changes in the relative pressure between the first pressure port 21 and the second pressure port 22 effect movement of the pneumatic vertical actuator 24. The functionality of the pneumatic vertical actuator 24 can be carried out by various means of actuation, such as by an electric motor driven screw-type drive, a spring-biased capacitive connection, or a pneumatic vertical actuator pancake ram air device like the model PSD1-0-125 double-action pancake actuator available from Fabco-Air, Inc., of Gainesville, Fla.

Figure 3A:
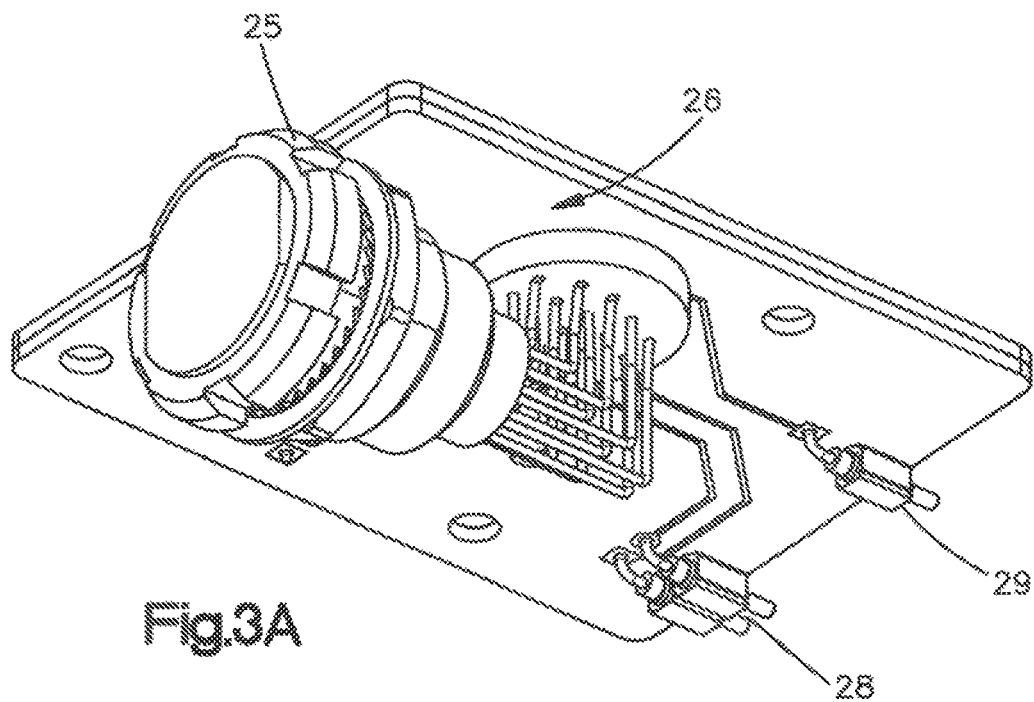
FIGS. 3A and 3B are bottom perspective views of a base printed circuit board connected to a base connector port of the platform of FIG. 1.
Figure 3B:
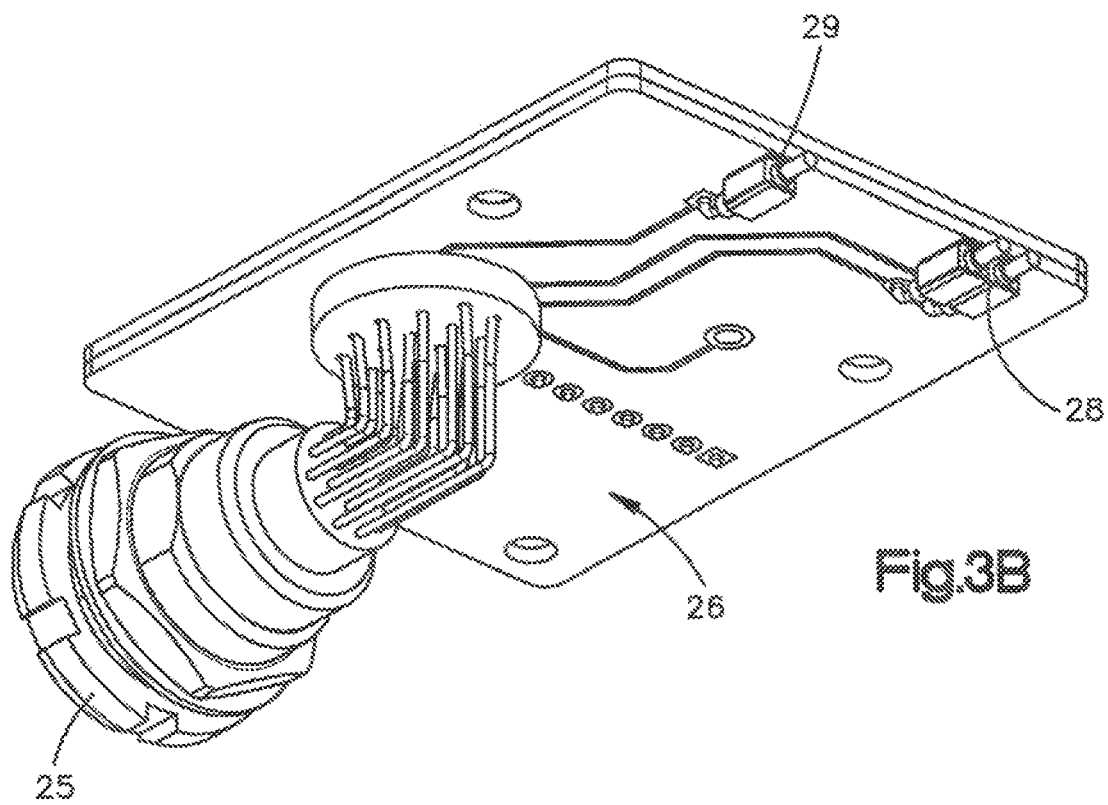
Figure 3C:
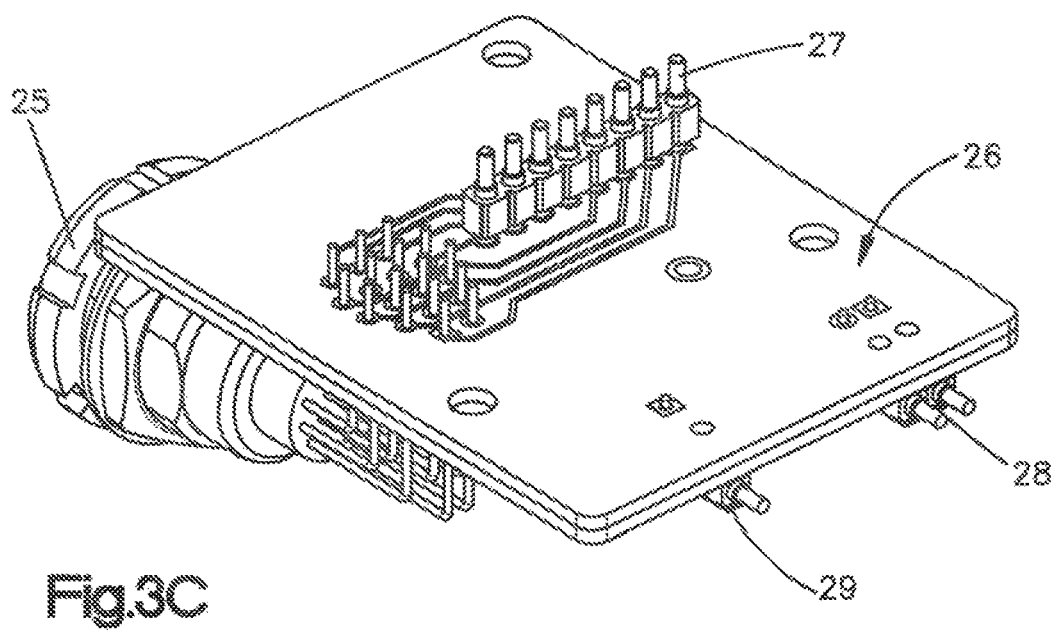
FIG. 3C is a top perspective view of a base printed circuit board connected to a base connector port of the platform of FIG. 1.
Figure 4A:
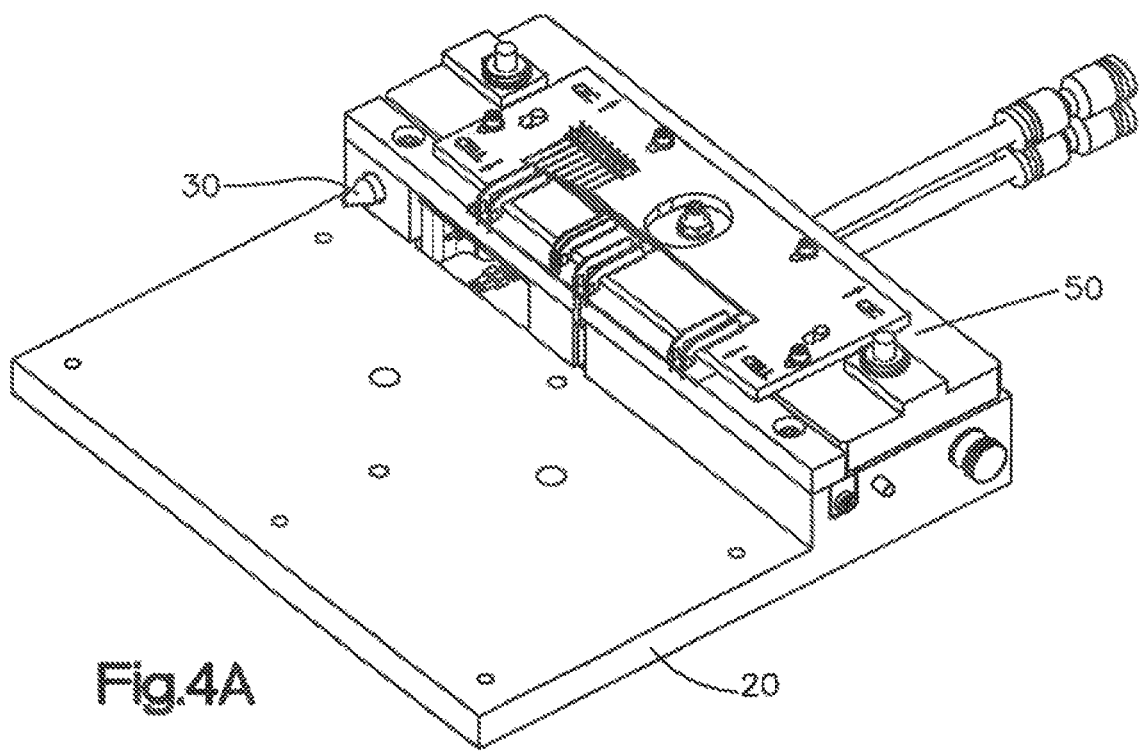
FIG. 4A is a top perspective view of a subassembly of the platform of FIG. 1, with the modular probe plate portion removed.

As shown in FIGS. 3A, 3B, and 3C, a base printed circuit board 26 includes an electrical connection to the base connector port 25, and as shown in FIG. 2, is fixedly mounted atop the base 20. The probe card 50 and the probe plate 70 (FIG. 1) releasably connect to the exterior 23 of the base 20 (see also FIGS. 5A and 5B), with the probe card 50 engaging a portion of the pneumatic vertical actuator 24 such that motion of the pneumatic vertical actuator effects motion of the probe card 50 (FIGS. 4A and 4B). While FIG. 1 depicts one size solar cell 10, the probe plate 70 (FIG. 1) may be configured to receive a plurality of different-shaped solar cells for electrical performance testing under a variety of temperature and lighting conditions. In other examples, any one of the base 20, the probe card 50, and the probe plate 70 may be integrally formed with one another.

As shown in FIGS. 3A, 3B, and 3C, in examples, the base printed circuit board 26 includes a first current probe tip 29 and may include a set of male pins 27 and a pair of thermistor pogo pins 28. As shown in FIGS. 5A and 5B, the pair of thermistor pogo pins 28 and the first current probe tip 29 are disposed on the exterior 23 of the base 20. In examples, the base 20 includes an alignment pin 30 on the exterior 23 of the base. As shown in FIGS. 6A and 6B, the base 20 (FIG. 2) may house a voltage armature 32 connected to the pneumatic vertical actuator 24 and disposed against a horizontal pivot pin 31. A first voltage probe tip 33 is mounted to the voltage armature 32 in an arrangement whereby a downward movement of the pneumatic vertical actuator 24 effects an upward movement of the first voltage probe tip 33. The first voltage probe tip 33 is electrically connected to the base connector port 25 (FIG. 2).

Figure 7A:
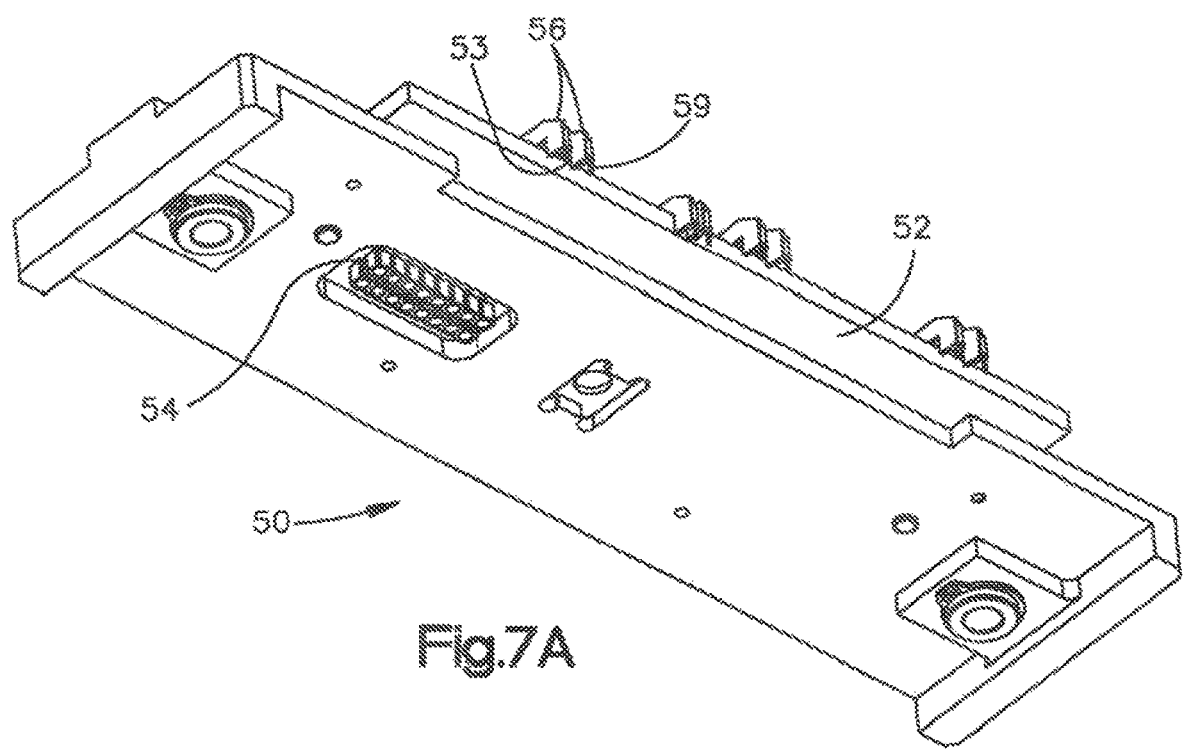
FIG. 7A is a bottom perspective view of a probe card subassembly of the platform of FIG. 1.

As shown in FIGS. 7A, 7B, and 7C, the probe card 50 may include a card printed circuit board 52 having a set of female pins 54 configured to align with the set of male pins 27 on the base printed circuit board 26 (FIG. 3C). As shown in FIG. 7B, at least one pair of armatures 56 is connected to the card printed circuit board 52, wherein the pair of armatures may vertically position a pair of pogo pins, which may take the form of a second voltage probe tip 53 and a second current probe tip 59. As shown in FIG. 1, electrical testing of the solar cell 10 can commence whereby upon placement of the solar cell on the probe plate 70, movement of the pneumatic vertical actuator 24 initiates electrical contact with the solar cell 10. At least two voltage contacts are made with the solar cell 10, one from below by the first voltage probe tip 33 (FIGS. 6A and 6B) and at least one from above by the second voltage probe tip 53. At least two current contacts are made with the solar cell 10: one is initiated from below by a the first current probe tip 29 (FIGS. 3A-3C), and at least one from above by the second current probe tip 59.

As shown in FIGS. 8A, 8B, and 8C, an example of the probe plate 70 may include a housing 80 having electrical contacts 102 (shown in FIG. 9A) that connect to a temperature sensor 100 (shown with dashed lines in FIGS. 8A, 8B, and 9A) embedded into the housing 80, and a coolant channel 110 disposed within the housing. The coolant channel 110 includes a coolant channel input 112 on the input side surface 88 of the housing 80 and a coolant channel output 114 on the output side surface 89 of the housing. In such an example, the coolant channel 110 is filled with water, antifreeze, or other coolant fluids known to those skilled in the art. In this example, the probe plate 70 contains a first vacuum channel 120 within the housing 80 having a first vacuum input 122 on the input side surface 88 and a first series of unthreaded vacuum ports 124 on the conductive top surface 82. In prior art systems such vacuum ports were threaded to permit interchangeable plugging of ports that would not be covered by PVCs of smaller sizes. The metal burrs that would come off of such threaded ports would often cause damage to the surfaces of PVCs. The present disclosure no longer requires threaded ports because it dynamically adjusts to which vacuum ports have pressure applied based on the size of PVC presented.

The probe plate 70 also contains a second vacuum channel 130 within the housing 80, a second vacuum input 132 on the input side surface 88, and a second series of unthreaded vacuum ports 134 on the conductive top surface 82. FIG. 8A illustrates that the first series of unthreaded vacuum ports 124 and the second series of unthreaded vacuum ports 134 can be arranged in relation to one another so that a first-sized solar cell placed upon the conductive top surface 82 only abuts the first series of unthreaded vacuum ports 124, and a second-sized solar cell placed upon the conductive top surface 82 abuts both the first series of unthreaded vacuum ports 124 and the second series of unthreaded vacuum ports 134, wherein the second-sized solar cell is closer in size to the conductive top surface 82 than the first-sized solar cell in relation to the conductive top surface 82. Thus, when the second-sized solar cell is placed upon the conductive top surface 82, as opposed to when the first-sized solar cell is placed upon the conductive top surface 82, vacuum is applied to the second series of unthreaded vacuum ports 134 because the system can sense that they are covered. In an example, conductive top surface 82 is substantially covered by a conductive material, such as gold plating, to a degree that permits the solar cell underside 12 (not shown) to have sufficient contact with conductive top surface 82 for current conduction that is safe and efficient. In this example, solar cell underside 12 is configured for substantial contact with the conductive top surface 82, which is in turn conductively connected to a first housing contact 92.

Figure 9A:
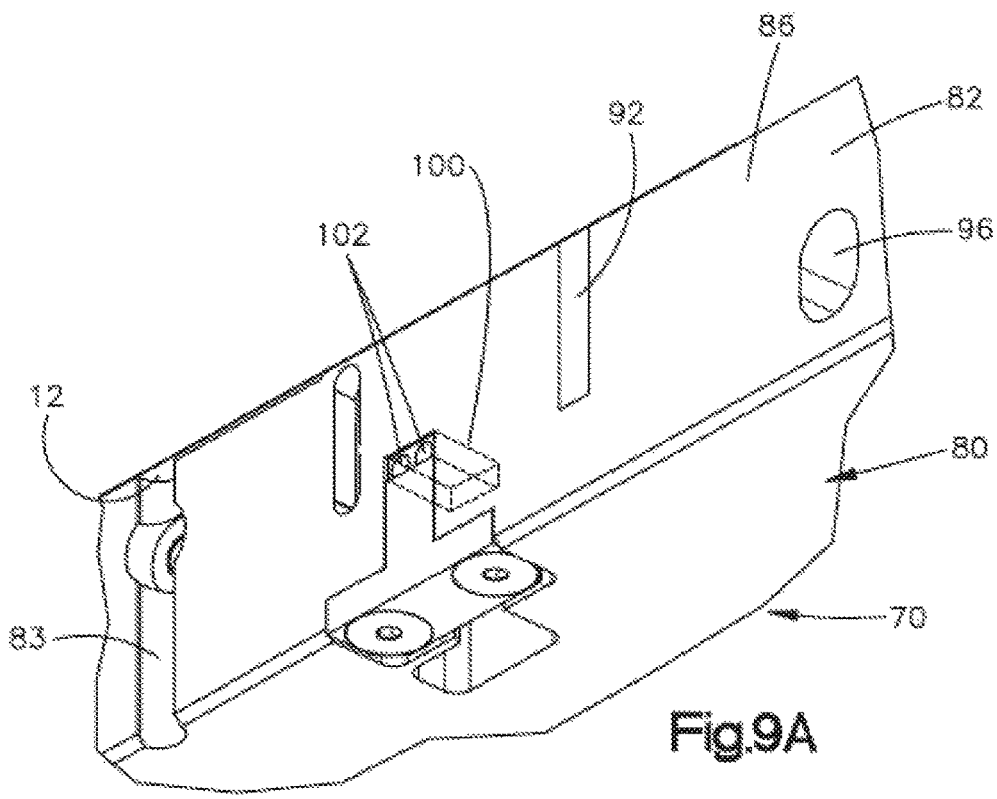
FIG. 9A is a detail perspective view of a modular probe plate of the disclosed temperature controlled platform for holding, probing, and testing solar cells.
Figure 9B:
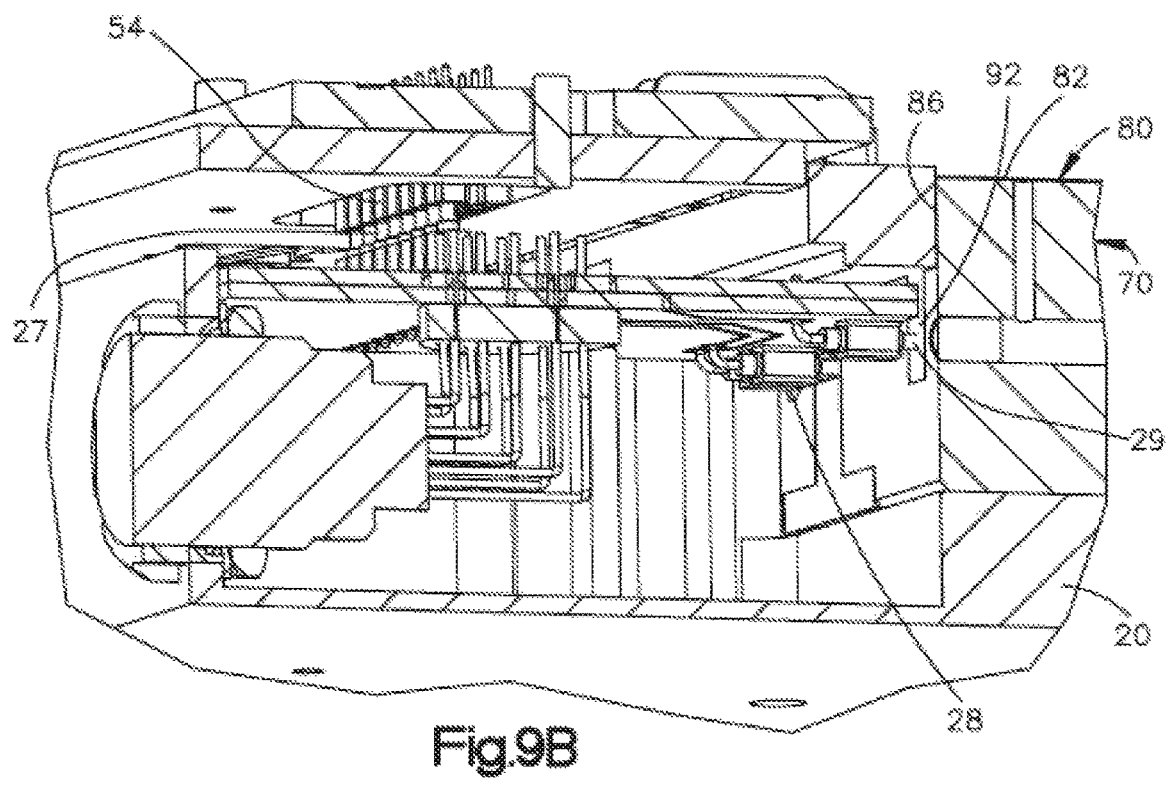
FIG. 9B is a detail cross-sectional view of the interface between the modular probe plate and the base printed circuit board subassembly of the platform of FIG. 9A.

As shown in FIGS. 9A and 9B, an example of the probe plate 70 may have the temperature sensor 100 integrated into the housing 80 and may include a pair of electrical contacts 102. The pair of electrical contacts 102 are configured to make contact with a pair of thermistor pogo pins 28. Upon connection between the probe plate 70 and the base 20, the first housing contact 92 is configured to come into contact with the first current probe tip 29, and an alignment hole 96 aligns with the alignment pin 30 (FIGS. 4A, 5A, and 5B). In a further example, each of the alignment hole 96, the first housing contact 92, and the pair of electrical contacts 102 is disposed on a side mating surface 86 of the conductive top surface 82. In a preferred example, the first housing contact 92 is disposed entirely on the exterior of the side mating surface 86. As seen in FIG. 9A, the side mating surface 86 is configured to include a voltage probe indent 83 to permit operation of the first voltage probe 33 as it makes contact with the solar cell underside 12.

As shown in FIG. 10, in another example of the present disclosure, a system for testing solar cells 10, generally designated 200, includes a host computer 220, a source meter 240 connected to the host computer 220, a control board 260 connected to the host computer 220 and the source meter 240, and a platform 1 connected to the control board 260 and the pressure-vacuum valve-sensor unit 280. The control board 260 includes a microprocessor 261, an analog-to-digital converter ("A-D Converter") 262, a plurality of switching relays 263, and a universal serial bus interface ("USB Interface") 264. The system 200 further includes a pressure-vacuum valve-sensor unit 280 connected to the control board 260, having a series of valves 282 and sensors 284 capable of monitoring and controlling pressure.

The pressure-vacuum valve-sensor unit 280 within the system 200 measures for vacuum in a first series of unthreaded vacuum ports 124 and a second series of unthreaded vacuum ports 134. In an example, a solar cell having a first shape covers only the first series of unthreaded vacuum ports 124 when placed on the top surface 82 of the housing 80 of the probe plate 70. And, a solar cell having a second shape (which can be a different size and/or shape from the first shape) covers both the first series of unthreaded vacuum ports 124 and the second series of unthreaded vacuum ports 134 when placed on the top surface 82 of the housing 80 of the probe plate 70. Following the placement of a second sized solar cell on the top surface 82 of the housing 80 of the probe plate 70, the pressure-vacuum valve-sensor unit 280 in the system 200 activates the second series of unthreaded vacuum ports 134. Then, after removal of the second sized solar cell, and following placement of a first sized solar cell on the top surface 82 of the probe plate 70 housing 80, the pressure-vacuum valve-sensor unit 280 deactivates the second series of unthreaded vacuum ports 134.

The control board 260 activates the pressure-vacuum valve-sensor unit 280 to adjust pressure between the first pressure port 21 and the second pressure port 22, causing at least one pair of pogo pins 53 and 59 (FIGS. 7A and 7B) to contact the leads on a corresponding solar cell and causing the first voltage probe tip 33 (FIGS. 6A and 6B) to contact the solar cell 10 (FIG. 1) from underneath. The control board 260 measures continuity for corresponding pairs of probe tips 33 to ensure resistance is below a set threshold based on individual testing parameters.

The control board 260 may control operation of the coolant pump and reservoir 290 which may circulate coolant through the probe plate 70 and may be connected to the coolant channel input 112 and the coolant channel output 114. The control board 260 measures the temperature of the probe plate 70 and routes current and voltage signals to the source meter 240 to perform a Kelvin measurement. The control board 260 sends temperature data to the host computer 220.

Figure 11:
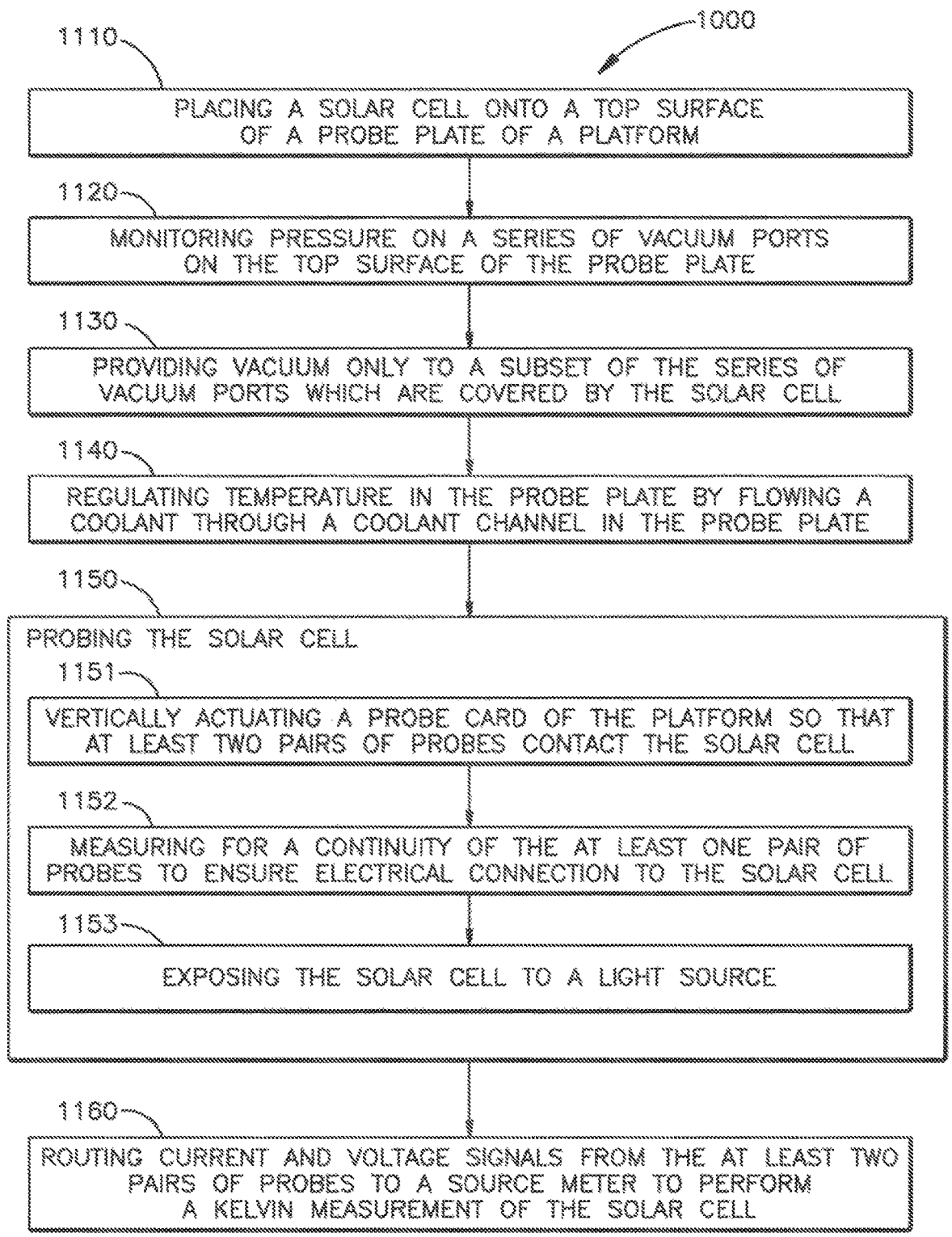
FIG. 11 is a flow diagram illustrating describing a method for the temperature controlled holding, probing, and testing of solar cells.

FIG. 11, shows a temperature-controlled method for holding, probing, and testing solar cells, generally designated 1000, utilizing the platform 1 shown in FIGS. 1-10 and described herein. As shown in block 1110, the method begins with the placement a solar cell 10 onto the top surface 82 of the probe plate 70 of the platform 1. In block 1120, the pressure on a series of vacuum ports 124, 134 on the top surface 82 is monitored by the sensor unit 280. In block 1130, vacuum is only provided to a subset of the series of vacuum ports 124 that are covered by the solar cell 10 by an external source (not shown). In block 1140, the temperature of the probe plate 70 is regulated by flowing a coolant through a coolant channel 110 in the probe plate 70 by means of, for example a pump or conventional coolant system (not shown). Next, as shown in block 1150, the solar cell 10 is probed by vertically actuating the probe card 50 of the platform 1, shown in block 1151, so that at least one pair of probes of the probe card 50 contact the solar cell 10, continuity of at least one pair of probes is measured to ensure electrical connection to the solar cell 10, as shown in block 1152, and in block 1153, the solar cell 10 is then exposed to a light source (not shown). As shown in block 1160, the current and voltage signals from at least one pair of probes of the probe card 50 is routed to a source meter 240 to perform a Kelvin measurement of the solar cell 10. For example, the light source that is exposed to the solar cell may be any suitable form of electromagnetic radiation, such as in part or in whole from the Sun, an incandescent lamp, a fluorescent lamp, a light emitting diode, or a solar simulator.

The solar simulator may be a light source, or more generically, an electromagnetic radiation source, that directs an artificially generated beam of concentrated illumination at a solar cell. For example, a solar simulator may illuminate a solar cell with concentrated illumination matched to American Society for Testing Materials (ASTM) Air Mass 1.5 D spectra in the intensity range 40 to 120 W/cmw (500 to 1300 Suns). Standard reference spectra, including AM0, AM1.5, and AM2 are described in ASTM G-173-03 available from ASTM International, West Conshohocken, Pa.

As disclosed in the foregoing, the PVC testing system and method of the present disclosure may utilize platforms configured to secure PVCs of varying sizes for safe, reliable, and efficient testing. While the following discussion describes various examples of the disclosed system and method as automatically adaptable to PVCs of many shapes and sizes, it is to be understood that the platform of the present disclosure may comprise interchangeable probe plates and/or interchangeable probe cards, such that the disclosed system and method is compatible with a variety of PVCs with minimal degrees of manual reconfiguration. From the foregoing, it will be appreciated that specific examples of the disclosure have been described herein for purposes of illustration, but that various modifications may be made without deviating from the disclosure. Aspects of the disclosure described in the context of particular examples may be combined or eliminated in other examples. Further, while advantages associated with certain examples of the disclosure have been described in the context of those examples, other examples may also exhibit such advantages, and not all examples need necessarily exhibit such advantages to fall within the scope of the disclosure. Accordingly, the disclosure is not limited except as by the appended claims.

What is claimed is:
1. A platform for testing a solar cell, the platform comprising:
a plate defining a conductive surface configured to electrically contact the solar cell, the plate defining:
two or more first vacuum ports disposed along a first area of the conductive surface of the plate; and
two or more second vacuum ports disposed along a second area of the conductive surface of the plate, the second area covering a larger portion of the conductive surface compared to the first area, and the solar cell is sized to seat against the first area of the conductive surface;
a valve-sensor unit in fluid communication with the first vacuum ports and the second vacuum ports; and
a control board connected to the valve-sensor unit, wherein the control board executes instructions to:
monitor a first pressure in the first vacuum ports and a second pressure in the second vacuum ports by the valve-sensor unit;

determine the solar cell is seated against only the first area of the conductive surface of the plate based on the first pressure and the second pressure; and
in response to determining the solar cell is seated against only the first area of the conductive surface, apply vacuum to only the first vacuum ports by the valve-sensor unit.

2. The platform of claim 1, wherein the solar cell is sized to be seated against both the first area and the second area of the conductive surface of the plate.

3. The platform of claim 2, wherein the control board executes instructions to:
determine the solar cell is seated against both the first area and the second area based on the first pressure and the second pressure; and
in response to determining the solar cell is seated against the first area and the second area of the conductive surface, apply vacuum to the first vacuum ports and the second vacuum ports by the valve-sensor unit.

4. The platform of claim 1, further comprising a first pair of probes and a second pair of probes both configured to actuate from a non-contact position and into a contact position, wherein the first pair of probes and the second pair of probes make electrical contact with the solar cell when in the contact position.

5. The platform of claim 4, wherein the first pair of probes and the second pair of probes are both connected to the control board, and wherein the control board executes instructions to:
monitor the first pair of probes for a first resistance and the second pair of probes for a second resistance when in the contact position;
determine the first resistance and the second resistance are below a threshold; and
in response to determining the first resistance and the second resistance are below the threshold, determine the first pair of probes and the second pair of probes are in electrical contact with the solar cell.

6. The platform of claim 4, further comprising a source meter, wherein the first pair of probes, the second pair of probes, and the source meter are connected to the control board, and wherein the control board executes instructions to:
monitor the first pair of probes for a voltage and the second pair of probes for a current when in the contact position; and
send signals representative of the voltage and the current to the source meter, wherein the source meter is configured to perform a Kelvin measurement of the solar cell based on the current and the voltage.

7. The platform of claim 4, wherein the first pair of probes measure voltage and the second pair of probes measure current.

8. The platform of claim 4, wherein the first pair of probes and the second pair of probes both include a first probe electrically contacting an upper surface of the solar cell and a second probe electrically contacting a lower side of the solar cell when in the contacting position.

9. The platform of claim 4, further comprising an actuator configured to actuate the first pair of probes and the second pair of probes from the non-contact position into the contact position.

10. The platform of claim 9, further comprising a first pressure port and a second pressure port in fluid communication with the actuator, wherein a relative pressure between the first pressure port and the second pressure port results in movement of the actuator.

11. The platform of claim 1, further comprising a first vacuum channel and a second vacuum channel located within a housing of the plate, wherein the first vacuum channel fluidly connects the first vacuum ports to the valve-sensor unit and the second vacuum channel fluidly connects the second vacuum ports to the valve-sensor unit.

12. The platform of claim 1, further comprising a temperature sensor configured to monitor a temperature of the plate.

13. The platform of claim 12, further comprising a coolant pump and a coolant channel defined within the plate, wherein the temperature sensor and the coolant pump are connected to the control board and the control board executes instructions to:
monitor the temperature sensor for the temperature of the plate; and
operate the coolant pump to circulate a coolant through the coolant channel based on the temperature of the plate.

14. The platform of claim 1, wherein the first vacuum ports and the second vacuum ports are unthreaded.

15. A method for testing a first solar cell, wherein the method comprises:
placing the first solar cell upon a plate, wherein the plate defines a conductive surface that electrically contacts the first solar cell;
covering, by the first solar cell, one or more first vacuum ports disposed along a first area of the conductive surface of the plate;
monitoring, by a valve-sensor unit, a first pressure in the first vacuum ports;
monitoring, by the valve-sensor unit, a second pressure in one or more second vacuum ports, wherein the second vacuum ports are disposed along a second area of the conductive surface of the plate, and wherein the second area covers a larger portion of the conductive surface when compared to the first area;
determining, by a control board, the first solar cell is seated against only the first area of the conductive surface of the plate based on the first pressure and the second pressure, wherein the control board is connected to the valve-sensor unit; and
in response to determining the first solar cell is seated against only the first area of the conductive surface, applying vacuum to only the first vacuum ports by the valve-sensor unit.

16. The method of claim 15, further comprising:
removing the first solar cell from the conductive surface of the plate;
placing a second solar cell upon the plate; and
covering, by the second solar cell, the first vacuum ports disposed along the first area of the conductive surface of the plate and the second area of the conductive surface of the plate.

17. The method of claim 16, further comprising:
determining, by the control board, the second solar cell is seated against both the first area and the second area based on the first pressure and the second pressure; and
in response to determining the second solar cell is seated against the first area and the second area of the conductive surface, applying vacuum to the first vacuum ports and the second vacuum ports by the valve-sensor unit.

18. The method of claim 15, further comprising:
actuating a first pair of probes and a second pair of probes from a non-contact position and into a contact position; and electrically contacting the first solar cell by the first pair of probes and the second pair of probes when in the contact position.

19. The method of claim 18, further comprising:

monitoring, by the control board, the first pair of probes for a first resistance and the second pair of probes for a second resistance when in the contact position;

determining, by the control board, the first resistance and the second resistance are below a threshold; and in response to determining the first resistance and the second resistance are below the set threshold, determining the first pair of probes and the second pair of probes are in electrical contact with the first solar cell.

20. The method of claim 18, further comprising:

monitoring the first pair of probes for a voltage and the second pair of probes for a current when in the contact position; and sending signals representative of the voltage and the current to a source meter, wherein the source meter is configured to perform a Kelvin measurement of the first solar cell based on the current and the voltage.

* * * * *